Dec. 6, 1960  J. W. MAY  2,962,880
PROTECTIVE ARRANGEMENT AGAINST TORQUE OVERLOAD
Filed April 8, 1959  2 Sheets-Sheet 1

Inventor:
Johann Wilhelm May
By
Patent Agent.

Dec. 6, 1960 J. W. MAY 2,962,880
PROTECTIVE ARRANGEMENT AGAINST TORQUE OVERLOAD
Filed April 8, 1959 2 Sheets-Sheet 2

Inventor:
Johann Wilhelm May
By

United States Patent Office 2,962,880
Patented Dec. 6, 1960

2,962,880

PROTECTIVE ARRANGEMENT AGAINST TORQUE OVERLOAD

Johann Wilhelm May, Rheinhausen, Germany, assignor by mesne assignments, to Beteiligungs- und Patentverwaltungsgesellschaft mit beschränkter Haftung, Essen, Germany Filed Apr. 8, 1959, Ser. No. 805,026

Claims priority, application Germany Apr. 19, 1958

7 Claims. (Cl. 64—28)

The present invention concerns a protective arrangement against torque overload, which includes at least one force limiting element, e.g. a shearing pin, arranged between two structural elements between which the torque is to be conveyed.

For purposes of limiting torques, it is known rotatably and coaxially to journal structural elements and to interconnect the same by at least one shearing pin. If, due to the fact that an intended maximum torque has been exceeded, the shearing pin tears off, the two coaxially journalled structural elements will rotate relative to each other without any further transfer of a torque. If such a relative rotation of the two structural elements occurs frequently and at high relative speed, the bearings will wear to such an extent that a play will occur between the two structural elements rotatable relative to each other. This wear will occur in particular if additionally the axle on which the two structural elements are journalled is subjected to strong vibrations. Such a bearing play brings about that the two structural elements are able not only to move relative to each other but also to move in radial direction. If the two structural elements are rigidly interconnected in a heretofore known manner by one or more shearing pins, the said shearing pins have to convey not only the torque but also to prevent the movement in radial direction of the two structural elements relative to each other. In addition thereto, the said shearing pins must absorb the force resulting from the vibrations and the weight proper of the structural element journalled in the worn-out bearing and also the force which by means of a gear or by belts for producing the torque is conveyed into one of said structural elements. This additional force may become considerable with regard to the force producing the torque and may thus caues the shearing pins to shear off, even though the intended maximum torque has not been reached by far. This in turn brings about a frequent stoppage of the driven machine and additional time loss caused by the time required for the insertion of new shearing pins.

It is, therefore, an object of the present invention to provide a protective arrangement against torque overload, which will overcome the above mentioned drawbacks.

It is another object of this invention to provide a protective arrangement for torque overload, in which the connection between the two structural elements having the protective arrangement according to the invention interposed therebetween will be interrupted only after the torque has reached the intended maximum magnitude.

It is a further object of this invention to provide a protective arrangement as set forth in the preceding paragraphs, which, following the interruption of the torque transmission through the arrangement according to the invention, will automatically protect the elements of the arrangement according to the invention against accidental breakage or damage.

These and other objects and advantages of the invention will appear more clearly from the following specification in connection with the accompanying drawings, in which.

General arrangement

With a protective arrangement against torque overload according to the present invention, the force resulting from the torque and absorbed by a force limiting element, e.g. a shearing pin, connected to one of the two structural elements, is conveyed to the other structural element by means of a tie or pull rod. This tie or pull rod is connected on one hand to said other structural element and on the other hand to the power limiting element, e.g. a shearing pin. The said tie or pull rod absorbs the power through at least one elastic member and is tiltable, at the two bearings through which the power is conveyed to said pull rod, about an axle which is parallel to that axle or shaft about which the torque to be conveyed is effective. In order, as far as possible, to avoid the building up of an unnecessary great force in the pull rod, the pull rod is arranged as far as possible tangentially with regard to a circle extending through the bearing of the pull rod and is arranged about the shaft about which the torque is effective. Advantageously, two power limiting members are provided, preferably two shearing pins, with two pull rods which are offset relative to each other by 180° between the two structural elements to thereby relieve the bearing between the two structural elements of the force resulting from the torque.

Instead of a shearing or tearing pin it is also possible to use another power limiting element, for instance a clamping device which is closed by springs pre-loaded by the force. Such clamping device may, if desired, following the release when the maximum power is exceeded, again be connected in as short a time as required for the insertion of a new shearing pin.

According to a further development of this invention, a spring may be provided which pulls into a rest position a pull rod provided for transfer of the force absorbed by the force limiting element, such as a shearing pin, for instance after the shearing pin has been shorn off. The pull rod will then remain in said rest position in which it is held, for instance by an abutment, against which the pull rod is pulled by the spring. The pull rod will be held in the said rest position in such a way that it cannot beat against parts of the other structural element rotating relative thereto.

Structural arrangement

Figure 1:
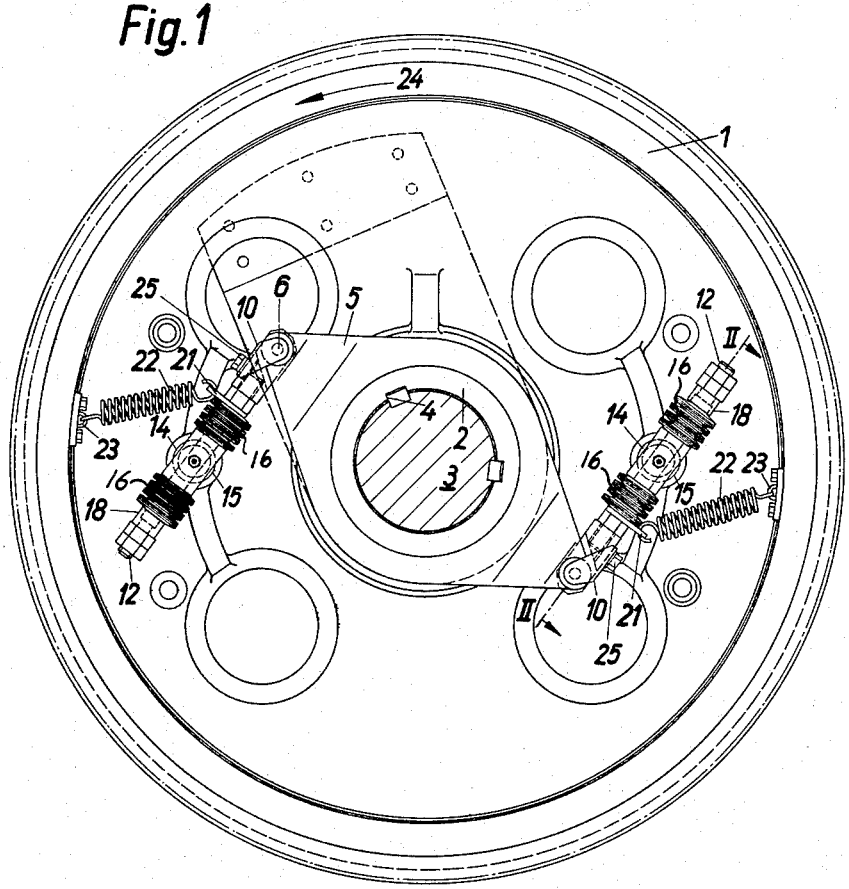
Fig. 1 is an axial view of a protective arrangement against torque overload according to the present invention.
Figure 2:
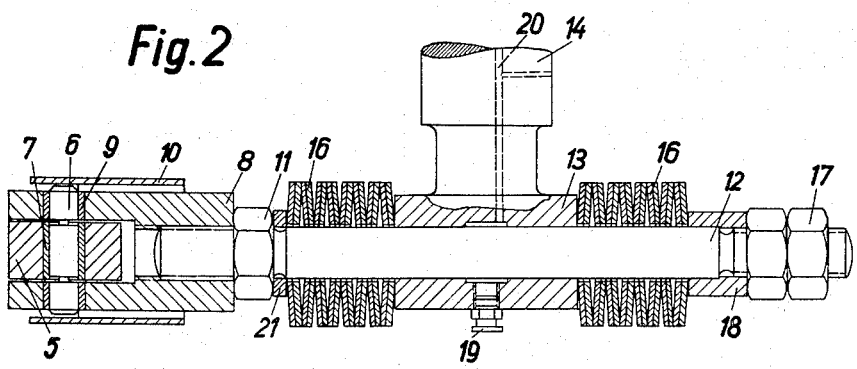
Fig. 2 is a section taken along the line II—II of Fig. 1 but on a considerably larger scale than that of Fig. 1.

Referring now to the drawings in detail and Figs. 1 and 2 thereof in particular, representing a first embodiment of an arrangement according to the invention, the reference numeral 1 designates a V-pulley which is rotatably journalled on a bushing 2. The bushing 2 is slipped over shaft 3, while keys 4 engaging corresponding grooves in bushing 2 will prevent bushing 2 from rotating relative to shaft 3. Bushing 2 comprises lateral ears 5 in which the shearing pins 6 are journalled. For purposes of journalling the shearing pins 6 in ears 5, sleeves 7 are inserted into said ears. The two outer ends of the shearing pins are respectively inserted into sleeves 9 which latter are journalled in fork-shaped holding members 8. The shearing pins 6 are respectively prevented by sliding sleeves 10 from dropping out of the fork-shaped holding members 8.

Tie rods 12 are respectively screwed into the fork-shaped holding members 8 and are secured thereon by nuts 11. Each tie rod 12 is adapted to slide in a sleeve 13 which is firmly connected to a bolt 14 which in its turn is tiltably journalled in a bore 15 of the V-pulley 1. Slipped over tie rod 12 are plate springs 16 which are clamped-in on one hand between nut 11 and sleeve 13, and on the other hand between sleeve 13 and an abutment sleeve 18 held in its position by nuts 17.

The purpose of the plate springs 16 consists in permitting displacement of shaft 3 relative to V-pulley 1 in a direction parallel to the direction of tie rod 12. Such displacement might occur when the bearings on bushing 2 have worn to a certain extent. When shaft 3 is displaced relative to V-pulley 1 in one direction which is defined by an imaginary line passing through the two shearing pins 6, said relative displacement is absorbed by a tilting movement of the tie rods 12 about the axes of bolts 14 in bores 15. A relative movement perpendicular to the said direction, i.e. parallel to said tie rods, can be absorbed only by the plate springs 16. The arrangement shown in Figs. 1 and 2 furthermore comprises a lubricating device 19 for supplying lubricant to the sliding surfaces of sleeves 13 on tie rod 12 and also supplies lubricant through a passage 20 to bore 15 in V-pulley 1. An ear 21 arranged at the fork-shaped holding member 8 between nut 11 and plate springs 16 is engaged by a tension spring 22 the other end of which is suspended in an ear 23 which is connected to the V-pulley 1.

Operation of the embodiment of Figs. 1 and 2

It may be assumed that V-pulley 1 is driven by a V-belt and rotates in the direction of the arrow 24. The force resulting from the torque of V-pulley 1 is conveyed through bolts 14 and plate springs 16 to the tie rods 12 and thereby to the fork-shaped holding members 8 and by the latter, through the intervention of shearing pins 6, is conveyed to the ears 5. The ears 5 rotate shaft 3 through the intervention of bushing 2 and keys 4.

If a certain intended maximum torque is exceeded, the force in tie rod 12 becomes so great that the shearing pins 6 will tear at the provided shearing points. When the shearing pins 6 have been torn off, the tie rod 12 will no longer convey power to the ears 5 so that shaft 3 will not rotate any longer, whereas V-pulley 1 will continue to rotate as before. Springs 22, however, will pull the fork-shaped holding members 8 and thereby the tie rods 12 outwardly to such an extent that the ears 5 will not be able to abut against the fork-shaped holding members 8.

After the damage which caused the intended maximum torque to be exceeded has been remedied, new shearing pins 6 are introduced through the fork-shaped holding members 8 and the bore into the ears 5, whereupon the device is again ready for operation.

Figure 3:
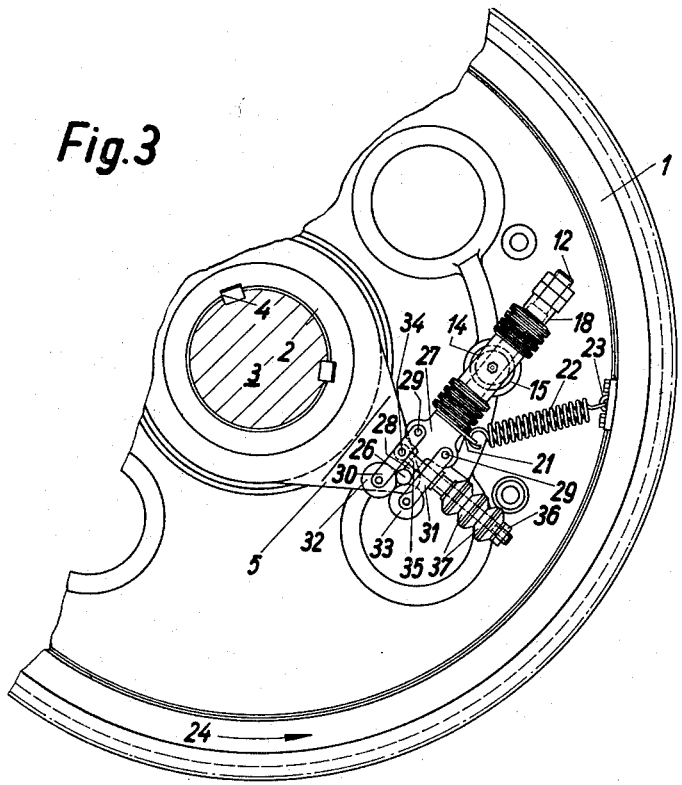
Fig. 3 shows, similar to Fig. 1, an axial view of a modified protective arrangement according to the invention.

Embodiment of Fig. 3

Instead of shearing or tearing pins as shown in the embodiment of Figs. 1 and 2, it is also possible to use another power limiting element as disclosed for instance in the arrangement of Fig. 3. This arrangement comprises similar parts as those described in connection with Figs. 1 and 2 and, accordingly, similar parts have been designated with the same reference numerals as Figs. 1 and 2.

The arrangement of Fig. 3 differs from that of Figs. 1 and 2 in that the ear 5 has fixedly connected thereto a stud 26. Furthermore, the tie rod 12 has fixedly connected thereto a head 27 which is provided with an abutment 28 resting against stud 26. Two pairs of links 30 and 31 respectively are journalled on the tie rod head 27. Rotatably journalled between links 30 is a roller 32, whereas a roller 33 is rotatably journalled between links 31. The arrangement of Fig. 3 also comprises a joint 34 at which a tie rod 35 is connected to links 30. The free end of tie rod 35 has mounted thereon nuts 36. Between nuts 36 and links 31 there are clamped plate springs 37 continuously urging rollers 32 and 33 to move toward each other and to clamp stud 26 therebetween and the abutment 28.

Operation of the embodiment of Fig. 3

If V-pulley 1 is rotated in the direction of arrow 24, the force resulting from the torque is conveyed through bolt 14 and plate springs 16 to tie rod 12 and thereby to the tie rod head 27 from where it is conveyed to links 30 and 31. Inasmuch as the rollers 32 and 33 clamp stud 26 between themselves and the abutment 28, the force is furthermore conveyed to stud 26 and thereby to ear 5. If now for some reason this force exceeds a certain maximum magnitude, rollers 32 and 33 will be pressed apart by stud 26 against the thrust of springs 37 whereby stud 26 will be released.

It is, of course, to be understood that the present invention is, by no means, limited to the particular constructions shown in the drawings but also comprises any modifications within the scope of the appended claims.

What I claim is:

1. In a torque limiting system: a driving member, a a driven member, torque limiting means interposed between said driving member and said driven member and adapted in response to a certain torque acting thereupon to interrupt the power flow from said driving member to said driven member, said torque limiting means being connected to one of said members, pivot means tiltably connected to the other one of said members, connecting means connected to said torque limiting means, elastic means interposed between said connecting means and said pivot means, means connecting said connecting means to said pivot means through said elastic means, and spring means connected to said connecting means and said driving member and continuously urging said connecting means away from said torque limiting means and out of the path of said driven member.

2. In a torque limiting system; a driving member, a driven member, torque limiting means interposed between said driving member and said driven member and adapted in response to a certain torque acting thereupon to interrupt the power flow from said driving member to said driven member, said torque limiting means being connected to one of said members, pivot means tiltably connected to the other one of said members, connecting means connected to said torque limiting means, elastic means interposed between said connecting means and said pivot means, and means connecting said connecting means to said pivot means through said elastic means.

3. In a torque limiting system: a rotatable driving member, a rotatable driven member, a shearing pin interposed between said driving member and said driven member and connected to said driven member for conveying power from said driving member to said driven member, said shearing pin being adapted in response to a certain torque acting thereupon to shear off to thereby interrupt the power flow from said driving member to said driven member, tie-rod means having one end connected to said shearing pin, sleeve means surrounding said tie-rod means and provided with a stud pivotally journalled in said driving member, first spring means arranged between one end of said sleeve means and said shearing pin, second spring means interposed between the other end of said sleeve means and the other end of said tie-rod means, and means firmly connecting said tie-rod means and said first and second spring means and said sleeve means to each other.

4. In a torque limiting system: a rotatable driving member, a rotatable driven member, a bushing rotatably connected to said driven member and provided with oppositely located ears, a plurality of torque limiting means interposed between said driving member and said driven member and respectively pivotally connected to said ears for conveying power from said driving member to said driven member, said torque limiting means being adapted in response to the torque acting thereupon exceeding a certain maximum value to interrupt the power flow from said driving member to said driven member, a plurality of tie-rods respectively pertaining to said torque limiting means, connecting means respectively connecting said torque limiting means to the respective tie-rod pertaining thereto, pivot means respectively pertaining to said tie-rods and pivotally connecting said tie-rods to said rotatable driving member, and elastic means interposed between said pivot means and said connecting means.

5. In a torque limiting system: a driving member, a driven member, stud means connected to one of said members, torque limiting means interposed between said two members and including yieldable clamping means normally yieldably clamping said stud means therebetween to thereby connect said stud means to said torque limiting means, and tie-rod means having one end connected to said clamping means and being pivotally connected to the other one of said two members, said clamping means being adapted in response to a torque in excess of a certain desired maximum torque acting upon said clamping means to yield and release said stud means to thereby interrupt driving connection between said driving member and said driven member.

6. In a torque limiting system: a driving member, a driven member, stud means connected to one of said members, torque limiting means interposed between said two members and including yieldable clamping means normally yieldably clamping said stud means therebetween to thereby connect said stud means to said torque limiting means, tie-rod means having one end connected to said clamping means, pivotal connecting means movably connected to said tie-rod means and pivotally connected to the other one of said two members, end means mounted on the end portions of said tie-rod means, and elastic means interposed between said end means and said pivotal connecting means, said clamping means being adapted in response to a torque in excess of a certain desired maximum torque acting upon said clamping means to yield and release said stud means to thereby interrupt driving connection between said driving member and said driven member.

7. In a torque limiting system: a rotatable driving member, a rotatable driven member, a shearing pin interposed between said driving member and said driven member and connected to said driven member for conveying power from said driving member to said driven member, said shearing pin being adapted in response to a certain torque acting thereon to shear off to thereby interrupt the power flow from said driving member to said driven member, tie-rod means having one end connected to said shearing pin, sleeve means surrounding said tie-rod means and provided with a stud pivotally journalled in said driving member, first spring means arranged between one end of said sleeve means and said shearing pin, second spring means interposed between the other end of said sleeve means and the other end of said tie-rod means, means firmly connecting said tie-rod means and said first and second spring means and said sleeve means to each other, and third spring means continuously urging said tie-rod means away from said torque limiting means out of the path of rotation of said driven member to thereby prevent said driven member from damaging said tie-rod means in response to said torque limiting means interrupting the power connection between said driving member and said driven member.

References Cited in the file of this patent
UNITED STATES PATENTS

| | | |
|---|---|---|
| 1,145,724 | Warsen | July 6, 1915 |
| 2,838,920 | Hill et al. | June 17, 1958 |